United States Patent

Koide

[15] 3,663,189
[45] May 16, 1972

[54] AUTOMATIC END SURFACE POSITIONING APPARATUS FOR USE WITH DIGITALLY CONTROLLED MACHINE TOOLS

[72] Inventor: Tsuyoshi Koide, Kariya, Japan
[73] Assignee: Toyoda Koki Kabushiki Kaisha, Kariyashi, Aichi-ken, Japan
[22] Filed: Mar. 19, 1970
[21] Appl. No.: 20,970

[30] Foreign Application Priority Data
Mar. 25, 1969 Japan.................................44/22981

[52] U.S. Cl. ..........................................51/165.8, 51/165 TP
[51] Int. Cl.........................................................B24b 49/00
[58] Field of Search.........51/165 R, 165 TP, 165.71, 165.77, 51/165.8, 165.87, 165.88, 165.72

[56] References Cited

UNITED STATES PATENTS 2,745,222  5/1956  Charf et al. ..........................51/165.72
2,837,875  6/1958  Happel................................51/165 X
3,193,976  7/1965  Luebkemann..........................51/165

Primary Examiner—Lester M. Swingle
Attorney—Wenderoth, Lind & Ponack

[57] ABSTRACT

For use with a digitally controlled machine tool wherein a workpiece having a plurality of spaced apart end surfaces to be machined is rotatably supported between a head stock and a tail stock mounted on a table and a tool carriage having a tool thereon is moved toward and away from the workpiece there is provided an automatic end surface positioning apparatus comprising an automatic end surface measuring device mounted upon the bed of the machine tool to be slidable in the same direction as the table, a threaded rod and a pulse motor to slide the automatic end surface measuring device and a control circuit for simultaneously or selectively operating the driving pulse motor for the table and the driving pulse motor for the automatic end surface measuring device in response to the output signal produced thereby.

6 Claims, 7 Drawing Figures

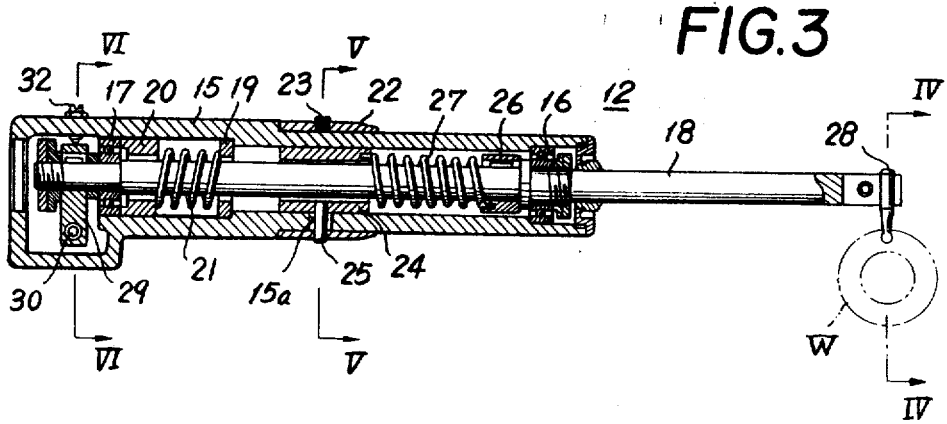
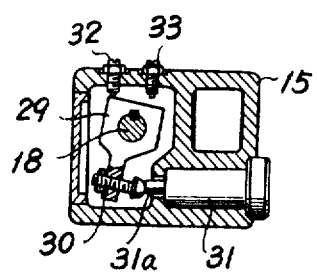
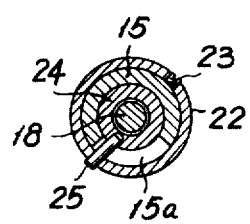
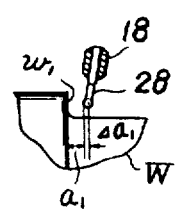
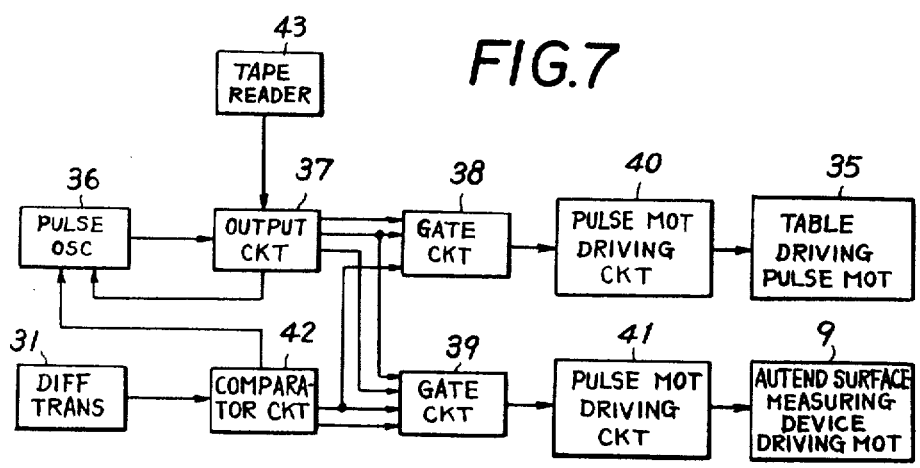

3,663,189

AUTOMATIC END SURFACE POSITIONING APPARATUS FOR USE WITH DIGITALLY CONTROLLED MACHINE TOOLS

BACKGROUND OF THE INVENTION

This invention relates to an automatic end surface positioning apparatus whereby an end surface of a workpiece is precisely machined by a digitally controlled machine tool and more particularly to a novel end surface positioning apparatus whereby end surfaces of a stepped workpiece spaced apart by predetermined distances are precisely ground which workpiece is supported on centers of a head stock and of a tail stock mounted on a table which is moved according to digital command signals.

In spite of the long felt need of the art, in the past, there has not been proposed an automatic end surface positioning apparatus employing a single end surface measuring device to measure the spacing between a plurality of end surfaces to be machined, for example by a grinding operation, so as to produce a signal when the spacing between adjacent end surfaces is ground to the prescribed dimension.

Prior art automatic end surface positioning apparatus is classified into following two types. The first type comprises a stationary contact adapted to engage a reference end surface of the workpiece and a movable contact adapted to engage an end surface of the workpiece to be machined or ground. When the spacing between two end surfaces is ground to a desired value, the output voltage from a differential transformer having a magnetic core normally held in contact with the movable contact reaches a predetermined value to produce a signal which is used to stop feeding of the table. With this positioning apparatus, although it is possible to provide a constant spacing between adjacent end surfaces irrespective of the wear of the grinding wheel, it is not possible to continuously grind a plurality of end surfaces with different spacings, to provide correct spacing. In the second type, while a probe of an automatic end surface measuring device mounted upon a bed is urged against a reference end surface of a workpiece the table is positioned so as to bring the reference end surface to a definite position with reference to the bed. Then the grinding wheel is advanced to grind the end surface of the workpiece. With this arrangement since the end surface of the workpiece to be ground is positioned with reference to the bed it is impossible to detect the quantity of wear of the side working surface of the grinding wheel so that such wear introduces an error in the spacing between the reference surface and the end surface of the workpiece to be ground.

SUMMARY OF THE INVENTION

It is therefore an object of this invention to provice a novel end surface positioning apparatus whereby a plurality of spaced apart end surfaces of a workpiece may be accurately machined with correct spacings therebetween maintained.

Another object of this invention is to provide a novel end surface positioning apparatus whereby a plurality of spaced apart end surfaces of a workpiece may be automatically and continuously machined with correct spacings.

A further object of this invention is to provide a novel end surface positioning apparatus having an end surface measuring or sensing device especially useful to perform such a machining operation.

For use with a digitally controlled machine tool of the type wherein a table carrying a head stock and a tail stock is slidably mounted on a bed, a stepped workpiece having a plurality of end surfaces to be machined is rotatably supported between the head stock and the tail stock, a tool carriage is mounted on the bed to be movable toward and away from the workpiece, and the table is operated by a pulse motor through a threaded rod, this invention provides an automatic end surface positioning apparatus comprising an automatic end surface measuring device mounted upon the bed so as to be slidable in a direction parallel to the sliding movement of the table, a threaded rod and a pulse motor to slide the automatic end surface measuring device and a control circuit for simultaneously or selectively operating the driving pulse motor for the table and the driving pulse motor for the automatic end surface measuring device in response to the output signal from the automatic end surface measuring device.

BRIEF DESCRIPTION OF THE DRAWING

The invention can be more fully understood from the following detailed description taken in conjunction with the accompanying drawings in which:

FIG. 3 is an enlarged sectional view of an automatic end surface measuring device taken along a line III—III in FIG. 1;

FIGS. 4, 5 and 6 are sectional views of portions of the end surface measuring device taken along lines IV—IV, V—V and VI—VI in FIG. 3, respectively; and FIG. 7 is a block diagram of the control circuit embodying this invention.

DESCRIPTION OF THE PREFERRED EMBODIMENT

Figure 1:
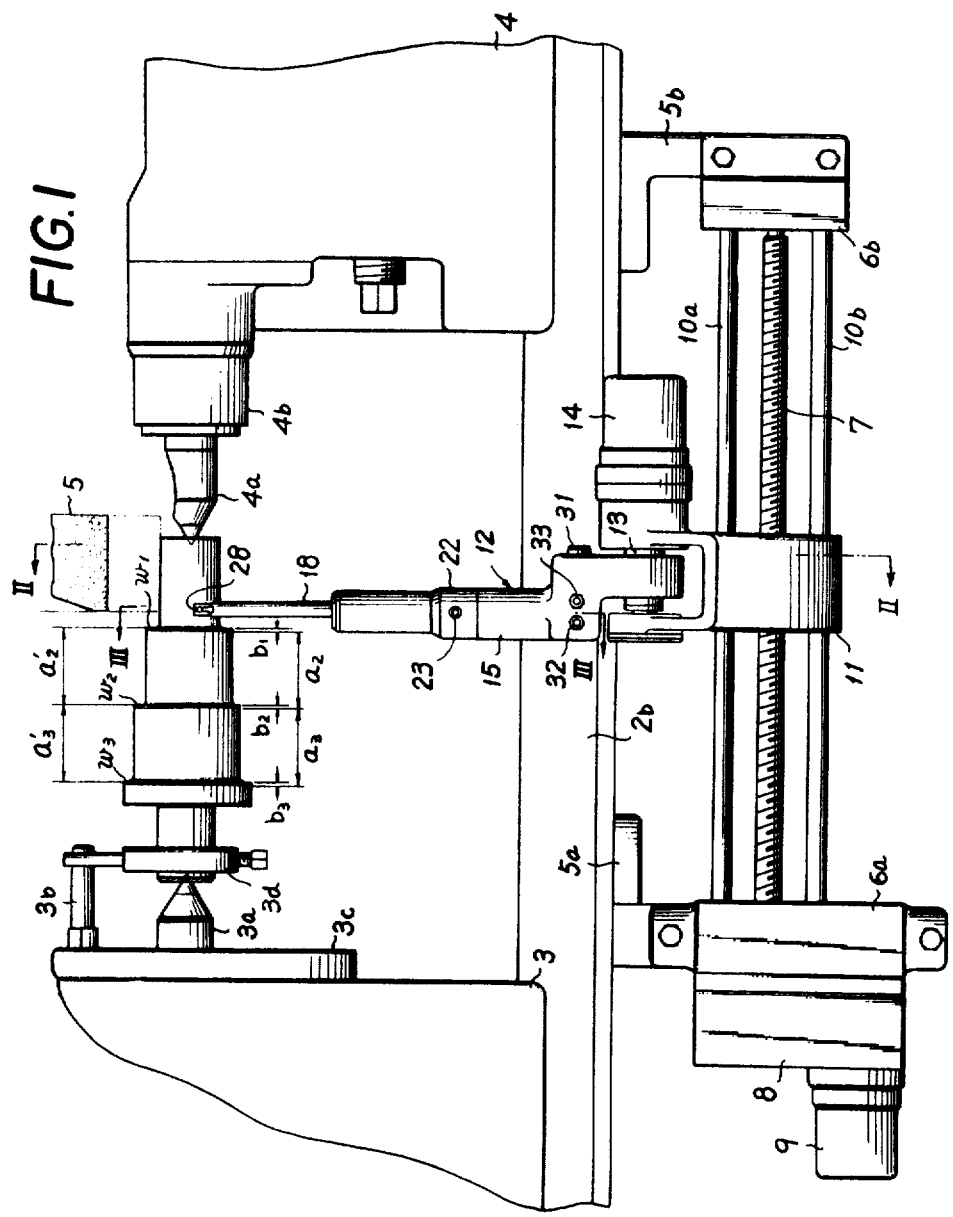
FIG. 1 is a plan view of a grinding machine provided with an automatic end surface positioning apparatus embodying this invention.
Figure 2:
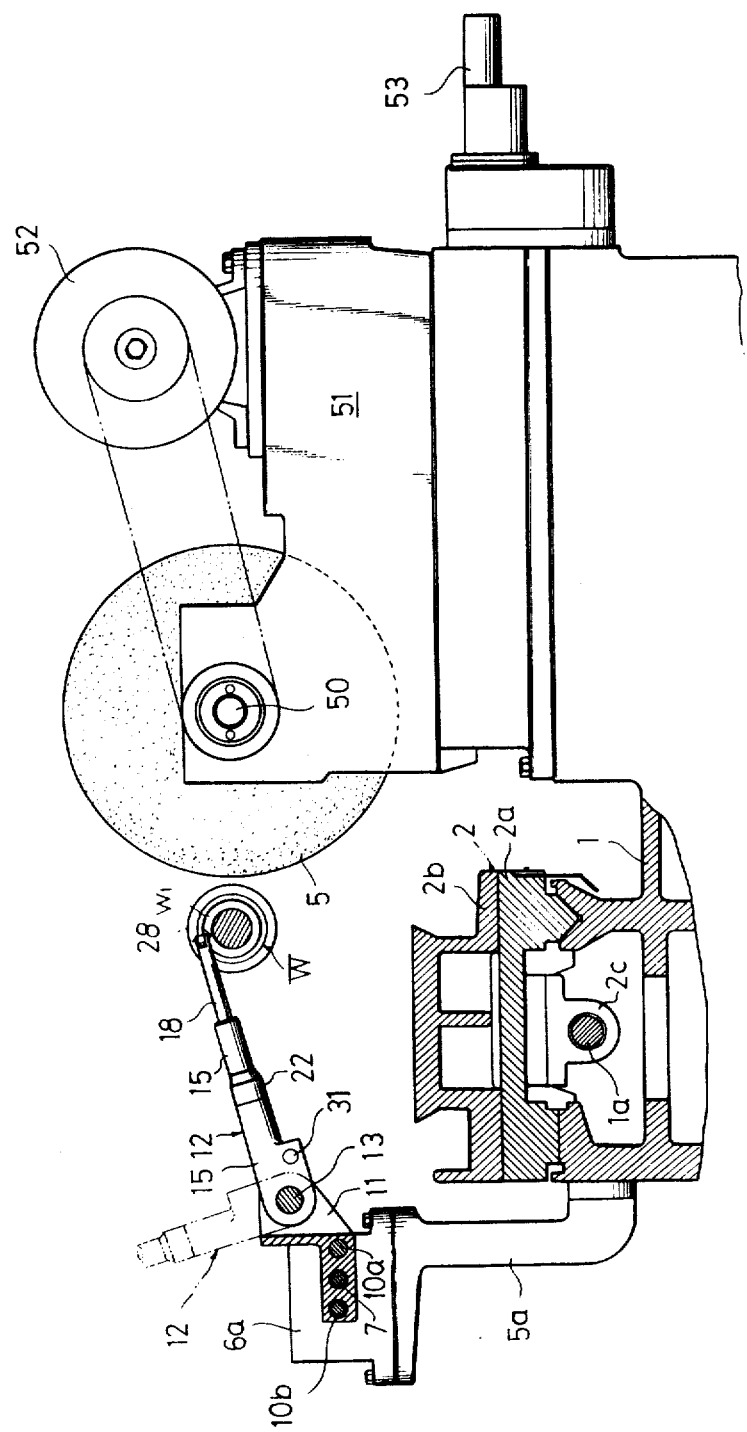
FIG. 2 is a sectional view taken along a line II—II in FIG. 1.

Referring now to FIGS. 1 and 2 of the accompanying drawing the machine tool is shown as comprising a horizontal bed 1, and a table 2 including a sliding base 2a slidable along the surface of the horizontal bed and a swivel slide 2b supported by sliding base 2a. A threaded rod 1a connected to a table driving pulse motor (to be described later) through a speed reduction gearing (not shown) is rotatably mounted on bed 1 in a direction parallel to the direction of the sliding movement of table 2. Threaded rod 1a is threaded through a feed nut 2c secured to the lower surface of sliding table 2 so as to move it when the threaded rod is driven by the pulse motor. Suitably spaced apart head stock 3 and a tail stock 4 are mounted on swivel slide 2b, said head stock 3 and tail stock 4 having centers 3a and 4a, respectively on the same axis. Center 4a of tail stock 4 is received in a ram 4b slidably mounted in tail stock 4 and normally biased towards the center 3a of head stock 3 by means of a spring (not shown) interposed between ram 4b and tail stock 4. Centers 3a and 4a function to clamp and hold therebetween a stepped workpiece W having a plurality of shoulders or end surfaces $W_1$, $W_2$ and $W_3$ to be worked. A driving bolt 3b is securely fixed to a rotary face plate 3c of head stock 3 to rotate the workpiece through an arm 3d. A grinding wheel 5 is mounted on a grinding wheel spindle 50 and the grinding wheel spindle is rotatably mounted upon a grinding wheel carriage 51 which is mounted on bed 1 to be movable towards and away from workpiece W. The grinding wheel spindle 50 is rotated at a high speed by an electric motor 52 mounted on the wheel carriage 51. The grinding wheel carriage can be moved toward and away from workpiece W by a pulse motor 53 secured to bed 1.

In a digitally controlled grinding machine of the type described above, in accordance with this invention, supporting blocks 6a and 6b are secured to bed 1 through supporting legs 5a and 5b and a threaded rod 7 is rotatably mounted on supporting blocks 6a and 6b in a direction parallel to the direction of the sliding movement of table 2. Threaded rod 7 is connected to a pulse motor 9 for longitudinally feeding an automatic end surface measuring device 12 via a speed reduction gearing 8. Guide rods 10a and 10b are mounted on supporting blocks 6a and 6b in parallel with threaded rod 7 as best shown in FIG. 2. A base 11 of automatic end surface measuring device 12 is threaded to threaded rod 7 and is adapted to slidably receive guide rods 10a and 10b so that the base can not rotate about the axis of threaded rod 7. A shaft 13 connected to a pulse motor 14 is rotatably supported by base 11 to pivotally support automatic end surface measuring device 12. The purpose of pulse motor 14 is to move automatic end surface measuring device 12 toward and away from the workpiece W in accordance with a digital command.

As illustrated in FIGS. 2 through 6, one example of automatic end surface measuring device 12 comprises a holder 15 pivotally mounted on shaft 13 and a supporting member 18 rotatably journalled in the holder 15 by a pair of bearings 16 and 17. A compression spring 21 is interposed between a thrust collar 19 held by an internal shoulder of holder 15 and another thrust collar 20 abutting against bearing 17 to apply a preload on bearings 16 and 17. An adjusting ring 22 fitted on the reduced diameter portion of holder 15 is secured thereto by means of a set screw 23.

The adjusting ring 22 is also connected to an inner ring 24 rotatably received in the axial bore of holder 15 through a pin 25 fixed to adjusting ring 22 and extending through a circumferential groove 15a of holder 15 as shown in FIG. 5. Thus adjusting ring 22 and inner ring 24 are rotated in unison and secured to holder 15 by set screw 23 at an adjusted position. As shown in FIG. 3, a torque spring 27 is interposed between a collar 26 keyed to holding member 18 and inner ring 24. A probe 28 is secured to the bifurcated end of the holding member 18 whereas a lever 29 is keyed to the rear end thereof so that the probe and lever are operated simultaneously. As shown in FIG. 6, an adjustable operating member 30 is threaded on lever 29 to engage a magnetic core 31a of a differential transformer 31 contained in holder 15, the magnetic core 31a being normally urged against operating member 30 by means of a spring and the like, not shown, in a range of the rotation of lever 29. Stops in the form of screws 32 and 33 are provided for holder 15 to limit the range of rotation of lever 29. The range of rotation of lever 29 is smaller than that of the adjusting ring 22 defined by the groove 15a of the holder 15.

The diameter of workpiece W is stepwisely reduced toward right as viewed in FIG. 1 and the probe 28 is positioned beneath holding member 18 so that when adjusting ring 22 is rotated in the clockwise direction as viewed in FIG. 5, the lever 29 will be brought into engagement with stop 32 and torque spring 27 will be twisted. At this time, set screw 23 is tightened to secure the adjusting ring 22. As a result when probe 28 is engaged by workpiece W from left, the probe 28 will be rotated in the counterclockwise direction against the bias of torque spring 27 whereby the operating member 30 mounted on lever 29 will push magnetic core 31a of differential transformer 31 to provide an output voltage across output terminals of the differential transformer corresponding to the angle of rotation of probe 28.

According to this invention a control circuit as shown in FIG. 7 is provided to control the longitudinal movement of table 2 and automatic end surface measuring device 12.

The control circuit shown in FIG. 7 comprises a pulse motor 35 connected to above mentioned threaded rod 1a to drive the table, and a pulse motor 9 for driving the automatic end surface measuring device. These pulse motors are energized by a pulse oscillator 36 through an output circuit 37, gate circuits 38 and 39 and pulse motor driving circuits 40 and 41. The output from the above described differential transformer 31 of the automatic end surface measuring device 12 is supplied to a comparator circuit 42. The output from a tape reader 43 is also supplied to output circuit 37.

Tape reader 43 reads command signals given by a perforated tape, for example, to transmit read out command signals to the output circuit 37. In this example, the command signals read out by tape reader 43 are classified into the following four types. The first type command signal operates to drive only the table driving pulse motor 35 for a predetermined number of revolutions in a predetermined direction to move table 2 and workpiece W to the right. The second type command signal operates only the automatic end surface measuring device driving pulse motor 9 for a predetermined number of revolutions in a predetermined direction to move end surface measuring device 12 to the left. The third type command signal operates to simultineously drive pulse motors 35 and 9 synchronously move to the right table 2, workpiece W and automatic end surface measuring device 12 whereas the fourth type command signal functions to drive only table driving pulse motor 35 to drive to the right table 2 and workpiece W.

Where the first type command signal, that is the signal for starting only the pulse motor 35 is transmitted to output circuit 37, this circuit causes pulse oscillator 36 to produce pulses at a predetermined rate which are applied to output circuit 37. Upon receiving the output pulses from the pulse oscillator the output circuit 37 enables gate circuit 38 to drive pulse motor 35 in a predetermined direction through pulse motor driving circuit 40. When the number of pulses passed through output circuit 37 coincides with the commanded value, gate circuit 38 is deactivated and the oscillation of pulse oscillator 36 ceases.

When the second type command signal or the signal for starting only pulse motor 9 is transmitted to output circuit 37, this circuit causes pulse oscillator 36 to generate pulses at the predetermined rate which are supplied to output circuit 37. In response to the output pulses from pulse oscillators 36, output circuit 37 operates to enable gate circuit 39 to drive automatic end surface measuring device driving motor 9 in a predetermined direction via pulse motor driving circuit 41. When the number of pulses passed through output circuit 37 coincides with the second command signal, the output circuit 37 deactivates gate circuit 39 to stop oscillation of pulse oscillator 36.

Further, when the third type command signal or the signal for simultaneously energizing both pulse motors 35 and 9 to move in synchronism to the right table 2, workpiece W and automatic end surface measuring device 12 is transmitted to output circuit 37 it will cause pulse oscillator 36 to generate pulses at a predetermined rate which are supplied to output circuit 37. In response to the output pulses from pulse oscillator 36, the output circuit 37 enables both gates 38 and 39 to drive in synchronism both pulse motors 35 and 9 by applying thereto pulses of the same number via pulse motor driving circuits 40 and 41. During this third command signal, upon coincidence of the output voltage from the differential transformer 31 with a predetermined reference voltage, the comparator circuit 42 produces a coincidence signal which is applied to gate circuits 38 and 39 to deactivate the same thus stopping the oscillation of pulse oscillator 36.

Finally, when the fourth type command signal or the signal for driving only the table driving pulse motor 35 to move to the right table 2 and workpiece W is applied to output circuit 37, it will cause pulse oscillator 36 to produce pulses at a predetermined rate which are applied to output circuit 37. In response to these pulses the output circuit 37 enables gate circuit 38 to drive table driving pulse motor 35 via pulse motor driving circuit 40. Again upon coincidence of the output voltage from differential transformer 31 with a reference value set in the comparator circuit 42, circuit 42 will provide a coincidence signal which is applied to gate circuit 38 to stop oscillation of pulse oscillator 36.

The above described automatic end surface positioning apparatus operates as follows:

The automatic end surface measuring device 12 is adjusted such that the left hand side of the spherical portion at the tip of the probe 28 is positioned to the left of the side working surface of grinding wheel 5 and table 2 is positioned such that the first end surface of workpiece $W_1$ to be worked or ground is positioned to the left of probe 28 of automatic end surface measuring device 9. Then, the grinding wheel 5 is advanced toward workpiece W by the operation of the grinding wheel carriage feed mechanism not shown in the drawing. When desired, the cylindrical portion of the workpiece may be ground under these conditions. Concurrently therewith, pulse motor 14 is driven by a command signal read out by tape reader 43 to advance automatic end surface measuring device 12 toward workpiece W to bring various elements into positions shown in FIGS. 1, 2 and 4.

Then the command signal read by tape reader 43 (the fourth command signal utilized to move table 2 to the right) operates to drive pulse motor 35 to move table 2 to the right by a distance $a_1$ shown in FIG. 4 through threaded rod 1a thus bringing probe 28 into contact against the first end surface $W_1$ of the workpiece to be ground. Further advance of table 2 to the right by an increment $\Delta a_1$ will urge the first end surface $w_1$ to be ground against probe 28 to rotate supporting member 18 in the counterclockwise direction. Consequently, operating member 30 moves magnetic core 31a of differential transformer 31 to the right to vary the output voltage thereof. When this output voltage coincides with the reference voltage in the comparator circuit 42, pulse motor 35 is deenergized to stop table 2 as above described. Under these conditions the first end surface $w_1$ to be ground is not yet in contact with the left hand side surface of the grinding wheel 5. Then, the pulse motor 9 is energized by a command signal read out by tape reader 43 (the second command signal for moving automatic end surface measuring device to the left by a distance $b_1$) to drive threaded rod 7 to move automatic end surface measuring device 12 to the left by $b_1$. At this time since the probe 28 is engaging the first end surface $w_1$, the supporting member 18 will further be rotated in the counterclockwise direction to move core 31a further to the right by the operating member 30.

Then by the signal read by tape reader 43 (the said third command signal to move the table 2 and the automatic end surface measuring device 12 in synchronism to the right) both pulse motors 35 and 9 are energized to operate in synchronism to synchronously move to the right table 2, workpiece W and automatic end surface measuring device 12. As a result, the first end surface $w_1$ to be ground will be brought into contact against the left side surface of grinding wheel 5 and ground. While both workpiece W and automatic end surface measuring device 12 are moved to the right, as the first end surface $W_1$ is ground, probe 28, measuring member 18 and operating member 30 are rotated in the clockwise direction. When the first end surface $w_1$ is ground by $b_1$, the probe 28 will be rotated back to the position where the output voltage from the differential transformer 31 coincides with the reference voltage set in the comparator circuit. Consequently, again the output voltage form differential transformer 31 coincides with the reference voltage in the comparator circuit 42 to produce a coincidence signal to deenergize both pulse motors 35 and 9 to stop feeding operation of table 2 and automatic end surface measuring device 12. At the same time the grinding wheel carriage feed mechanism operates to retract grinding wheel 5 thus finishing the grinding operation of the first end surface $w_1$. Irrespective of the wear of the grinding wheel 5 the first end surface $w_1$ will be ground by the amount which is equal to the longitudinal feed $b_1$ to the left of the automatic end surface measuring device 12. This means that the automatic end surface measuring device 12 is positioned to the original position to prepare for the next grinding operation.

Then pulse motor 14 is energized by a command signal read by tape reader 43 to rotate the automatic end surface measuring device 12 to a position corresponding to the second end surface $w_2$ of workpiece W to be ground. Then the pulse motor 35 is energized by another command signal read by tape reader 43 (above described first type command signal to move table 2 to the right by a distance $(a_2-b_1)$). After the table has been moved by $(a_2-b_1)$ motor 35 is stopped, where $a_2$ represents the desired finished dimension or distance between the first end surface $w_1$ and the second end surface $w_2$ of the workpiece, whereas $a_2'$ represents the spacing between the prefinished first end surface $w_1$ and the second end surface $w_2$ prior to the grinding operation. Accordingly, the difference or tolerance between $a_2'$ and $a_2$ varies dependent upon the difference in the previous working so that when table 2 is moved by a distance $(a_2-b_1)$ as above described the second end surface $w_2$ will be positioned slightly to the right or left of the left hand side surface of the grinding surface. Positioning of the end surface to be ground to the right of the left hand side surface of the grinding wheel 5 can be avoided by substituting $(b_1 + \alpha)$ for $b_1$, thus always positioning the end surface to be ground to the left of the grinding wheel 5 where $\alpha$ represents said tolerance caused by the prior grinding operation. However, to simplify the description this consideration is omitted from the following description.

Then the grinding wheel 5 is advanced toward the workpiece by the operation of the grinding wheel feed mechanism. At this stage, cylindrical portions of the workpiece W may be ground, if desired. Thereafter, a command signal read by tape reader 43 (of the above described second type for longitudinally moving automatic end surface measuring device 12 to the left by $b_1$) energizes pulse motor 9 to move the automatic end surface measuring device 12 to the left by $b_1$. Under these conditions probe 28 is urged against the second end surface $w_2$ to rotate supporting member 18 in the counterclockwise direction to move magnetic core 31a further to the right through operating member 30.

Then a command signal read by the tape reader 43 (of the above described third type for moving in synchronism to the right table 2 and automatic end surface sensing device 12) operates to drive in synchronism both motors 35 and 9 to synchronously move to the right table 2 and workpiece W as well as the end surface sensing device. Consequently, the second end surface $w_2$ will be ground by the left hand side surface of the grinding wheel 5. In this manner, workpiece W and automatic end surface sensing device 12 are moved to the right and as the second end surface $w_2$ of the workpiece W is ground, probe 28, supporting member 18 and operating member 30 are rotated in the clockwise direction. When the second end surface $w_2$ is ground until a quantity $b_2$ is removed from the second end surface $W_2$ the probe 28 will restore to the above described position wherein the output voltage from differential transformer 31 coincides with the reference voltage in the comparator circuit 42. Accordingly, comparator circuit 42 provides a coincidence signal to stop pulse motors 35 and 9 whereby feeding of table 2 and automatic end surface sensing device 12 ceases. Concurrently wherewith the grinding wheel carriage feed mechanism is operated to retract the grinding wheel to finish the grinding operation of the second end surface $w_2$ to be ground. During this operation, the second end surface $w_2$ is moved to the right by a distance $(a_2 - b_1)$ by the initial feed of table 2 from the position at which the first end surface $w_1$ is urged against probe 28 to generate a coincidence signal by comparator circuit 42, then the automatic end surface measuring device 12 is moved to the left a distance $b_1$. Thereafter, both table 2 and automatic end surface measuring device 12 are moved to a position at which comparator circuit 42 provides a coincidence signal after the second end surface $w_2$ has been ground to rotate again the probe 28 of automatic end surface measuring device 12 to the position where the comparator circuit 42 generates a coincidence signal. In other words, table 2 and automatic end surface measuring device 12 are moved to the right by a quantity corresponding to the sum of $b_1$ and the wear quantity $\Delta c_2$ of the left hand side surface of the grinding wheel 5, i.e., $(b_1 + \Delta c_2)$. Accordingly, the workpiece W is moved to the right by a distance $\{(a_2-b_1) + b_1 + \Delta c_2\}$ so that, notwithstanding the wear of the left hand side surface of the grinding wheel 5, the second end surface $w_2$ will be ground to a position which is spaced from the first end surface $w_1$ by a distance $a_2$ which is smaller than $(a_2 + \Delta c_2)$ by the wear quantity $\Delta c_2$ of the left hand side surface of the grinding wheel. Accordingly, the quantity $b_2$ removed from the second end surface $w_2$ equals $(a_2 + b_1 - a_2')$.

In this manner, when the grinding operation of the second end surface $w_2$ of the workpiece W is finished, the grinding wheel 5 is retracted and the automatic end surface measuring device 12 is moved to a position corresponding to the third end surface $w_3$ of the workpiece W to be ground by the operation of the pulse motor 14. Then, table 2 is moved to the right by a distance $(a_3 - b_1)$ similar to the grinding operation of the second end surface $w_2$ where $a_3$ represents the desired finished dimension of the spacing between the second and third end surfaces $w_2$ and $w_3$. Then the grinding wheel 5 is advanced and if desired, the cylindrical portions of the workpiece W may be ground. Then, by the operation of pulse motor 9 the automatic end surface measuring device 12 is moved to the left by $b_1$. Then, table 2 and automatic end surface measuring device 12 are moved to a position where comparator circuit 42 provides a coincidence signal. That is, they are moved to the right by a quantity corresponding to the sum of $b_1$ and the wear quantity $\Delta c_3$ of the left hand side surface of the grinding wheel, i.e., ($b_1 + \Delta c_3$). As a result, the workpiece W is moved to the right by a distance represented by $\{(a_3 - b_1) + b_1 + \Delta c_3\}$. Thus, irrespective of the wear of the left hand side surface of the grinding wheel, the third end surface $w_3$ of the workpiece W will be ground to a position spaced from the second end surface $w_2$ by a distance $a_3$ which is smaller than $(a_3 + \Delta c_3)$ by the wear quantity $\Delta c_3$ of the grinding wheel.

Thus, this invention provides a novel automatic end surface positioning apparatus according to which a single automatic end surface measuring device 12 is utilized to successively grind to dimension a number of end surfaces $w_1, w_2, w_3 \ldots$ of a workpiece which are spaced apart at different spacings without being affected by the wear of the working surface of the grinding wheel.

I claim:

1. In a digitally controlled machine tool including a bed, a table slidably mounted on said table to support a workpiece, a table driving means to slidably move said table along said bed, and a tool carriage arranged to be moved toward and away from said workpiece, an automatic positioning apparatus for an end surface of said workpiece comprising an automatic end surface measuring device arranged to be engaged by the end surface of said workpiece to generate an output proportional to the displacement of said end surface, means to mount said automatic end surface measuring device on said bed, means to move said measuring device in a direction parallel to the sliding direction of said table, and a control circuit including a comparator circuit to compare said output from said automatic end surface measuring device with a reference voltage to provide a coincidence signal when said output and said reference voltage coincide with each other, and means responsive to said coincidence signal to simultaneously or selectively energize said driving means for said table and said moving means for said automatic end surface measuring device, said control circuit operating to move by a predetermined quantity said automatic end surface measuring device toward said end surface to be worked and to move in synchronism said table and said automatic end surface measuring device in a direction to bring said end surface to be worked to come into contact with a tool carried by said tool carriage so as to work said end surface by said tool and said circuit including means to generate a signal when the output from said automatic end surface measuring device reaches a predetermined value.

2. A digitally controlled machine tool according to claim 1 wherein pulse motors are used to drive said table and said automatic end surface measuring device and said pulse motors are controlled by digital control pulses provided by said control circuit.

3. A digitally controlled machine tool according to claim 1, wherein said end surface measuring device comprises a probe to detect the displacement of said end surface of said workpiece and a differential transformer associated with said probe to provide an output signal proportional to said displacement.

4. A digitally controlled machine tool according to claim 3 wherein said automatic end surface measuring device comprises driving means operative to move said probe to the portions of the workpiece irrespective of the operation of the moving means for said measuring device so as to move the same to or near the measuring position.

5. A digitally controlled machine tool according to claim 3 wherein said end surface measuring device is provided with means for biasing said probe in a direction opposite to the direction of displacement of said end surface of said workpiece and means to adjust said biasing force whereby to detect said displacement.

6. A digitally controlled machine tool according to claim 5, wherein said end surface measuring device comprises a holder, a supporting member rotatably mounted in said holder and having on operating member at one end and said probe at the other end, said biasing means having a torque spring for biasing said probe in a direction opposite to the direction of displacement of said end surface of said workpiece, said biasing force adjusting means comprising an adjusting ring rotatably fitted on said holder, said torque spring being operably interposed between said adjusting ring and said supporting member, said differential transformer being mounted in said holder and engaged with said operating member, and a stop member causing the range of rotation of said supporting member to become smaller than that of said adjusting ring.

* * * * *